US012340706B2

(12) United States Patent
Swanson et al.

(10) Patent No.: US 12,340,706 B2
(45) Date of Patent: Jun. 24, 2025

(54) DRONE-BASED WATER MEASUREMENT SYSTEM

(71) Applicant: TidalX AI Inc, San Ramon, CA (US)

(72) Inventors: Thomas Robert Swanson, Sunnyvale, CA (US); Harrison Pham, Sunnyvale, CA (US)

(73) Assignee: TidalX AI Inc., Mountain View, CA (US)

( * ) Notice: Subject to any disclaimer, the term of this patent is extended or adjusted under 35 U.S.C. 154(b) by 223 days.

(21) Appl. No.: 18/202,054

(22) Filed: May 25, 2023

(65) Prior Publication Data

US 2024/0127701 A1    Apr. 18, 2024

Related U.S. Application Data

(60) Provisional application No. 63/415,567, filed on Oct. 12, 2022.

(51) Int. Cl.
| | | |
|---|---|---|
| *G08G 5/56* | (2025.01) | |
| *B64U 10/00* | (2023.01) | |
| *B64U 101/35* | (2023.01) | |
| *G01C 21/20* | (2006.01) | |

(52) U.S. Cl.
CPC ............. *G08G 5/56* (2025.01); *B64U 10/00* (2023.01); *G01C 21/20* (2013.01); *B64U 2101/35* (2023.01); *B64U 2201/20* (2023.01)

(58) Field of Classification Search
CPC ...... G08G 5/56; B64U 10/00; B64U 2101/35; B64U 2201/20; B64U 10/13; B64U 2101/00; B64U 2101/30; G01C 21/20
See application file for complete search history.

(56) References Cited

U.S. PATENT DOCUMENTS 11,217,106 B2    1/2022 Butler et al.

FOREIGN PATENT DOCUMENTS

| KR | 102351787 | 1/2022 |
|---|---|---|
| KR | 20220058779 | 5/2022 |

OTHER PUBLICATIONS

Croco-ocean.org [online], "CROCO, Coastal and Regional Ocean Community model," Jun. 22, 2017, retrieved on Oct. 30, 2024, retrieved from URL<https://www.croco-ocean.org/>, 3 pages.
Koparan et al., "Adaptive Water Sampling Device for Aerial Robots," Drones, Feb. 6, 2020, 4(1):5.

(Continued)

*Primary Examiner* — Alan D Hutchinson
(74) *Attorney, Agent, or Firm* — Fish & Richardson P.C.

(57) ABSTRACT

Methods, systems, and apparatus, including computer programs encoded on a computer storage medium, for obtaining drone-based water measurements. One of the methods includes receiving, by a drone management system that controls a drone that is configured to collect water samples, data from a simulator that generates simulation data associated with a body of water; receiving, by the drone management system, an indication that the drone is available to collect one or more water samples from the body of water; determining, by the drone management system and based on the data from the simulator, one or more locations associated with the body of water at which the drone is to collect one or more respective water samples; and; transmitting, by the drone management system, the one or more locations associated with the body of water to the drone.

20 Claims, 3 Drawing Sheets

(56) References Cited

OTHER PUBLICATIONS

Shelare et al., "Advances in water sample collections with a drone—A review," Materials Today: Proceedings, 2021, 47(14):4490-4494.

Wu et al., "A review on drone-based harmful algae blooms monitoring," Environmental Monitoring and Assessment, Mar. 9, 2019, 191(4):211.

DRONE-BASED WATER MEASUREMENT SYSTEM

CROSS-REFERENCE TO RELATED APPLICATION

This application claims the benefit of U.S. Provisional Application No. 63/415,567, filed on Oct. 12, 2022, the contents of which are incorporated by reference herein.

BACKGROUND

The subject matter described in this specification is related to water measurements.

SUMMARY

In general, innovative aspects of the subject matter described in this specification relate to a drone-based water measurement system that automatically aggregates requests from a water simulation system for water samples, and dispatches and controls one or more drones to obtain required water samples and corresponding measurements. The drone-based water measurement system can include a ranking subsystem that ensures that time-critical requests can be processed before lower-priority or less time-sensitive requests. The drone-based water measurement system can include a scheduling subsystem that aggregates requests for water samples and optimizes a route to obtain the requested water samples.

One innovative aspect of the subject matter described in this specification is embodied in a method that includes receiving, by a drone management system that controls a drone that is configured to collect water samples, data from a simulator that generates simulation data associated with a body of water; receiving, by the drone management system, an indication that the drone is available to collect one or more water samples from the body of water; determining, by the drone management system and based on the data from the simulator, one or more locations associated with the body of water at which the drone is to collect one or more respective water samples; and; transmitting, by the drone management system, the one or more locations associated with the body of water to the drone.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. The data from the simulator includes two or more requests for respective water samples, and the method further includes: ranking the two or more requests for the respective water samples based on one or more priority factors. The data from the simulator includes two or more requests for respective water samples, and the method further includes: aggregating the two or more requests for the respective water samples to generate an aggregated request; and determining a route to obtain the respective water samples based on the aggregated request. The method includes dynamically selecting, by the drone management system, the one or more locations while the drone is deployed to collect water samples. Dynamically selecting the one or more locations includes transmitting, by the drone management system, an updated sampling location to the drone. Dynamically selecting the one or more locations includes: searching, by the drone management system, for the one or more locations associated with the body of the water to take a sample in a given region. The drone includes a sensor boom that includes one or more sensors configured to collect sensor data, wherein dynamically selecting the one or more locations includes: obtaining, by the drone management system, the sensor data at one or more sensor sample locations; and determining, by the drone management system and using the sensor data, the one or more locations associated with the body of water at which the drone is to collect the one or more respective water samples.

Particular embodiments of the subject matter described in this specification can be implemented so as to realize one or more of the following advantages. Instead of installing many sensors throughout a target measurement area, the systems and techniques can provide near real-time measurements without fixed infrastructure in the water. The systems and techniques can obtain water samples and measurements over a very large area, and thus the water measurements can help improve the accuracy and confidence of the predictions from the water simulation systems. In some implementations, the systems and techniques can prioritize time-critical water samples, which is important for some water environments that change very rapidly. In some implementations, the systems and techniques can dynamically select sampling locations while the drone is out flying over the water to take water samples, e.g., using a machine learning model. For example, if the system determines that an original sampling location needs to be changed, the system can request water samples at an updated sampling location. In some implementations, the system can dynamically search for a suitable location in a given region to collect a sample.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A water simulation system can generate simulation data associated with a body of water, such as ocean, river, lake, etc. The simulation data can include predictions for physical properties, biochemical properties, or other properties, of the body of water. The physical properties can include, for example, ocean currents, temperature, salinity, etc. The biochemical properties can include, for example, dissolved oxygen, nitrate, carbon dioxide, pH levels, chlorophyll, etc. The water simulation system can simulate these properties of the water over a period of time and/or space, potentially on a three-dimensional grid representing the body of water, or a portion of the body of water, in a geographical region of interest.

To perform the simulations, the water simulation system can use certain initial and boundary conditions of simulation models. Such initial and boundary conditions can be determined based on water samples collected from various locations. Inaccurate initial and boundary conditions can be propagated and potentially amplified within the simulation model, which can ultimately lead to large uncertainties in the predictions. Therefore, it is important to obtain water measurement data accurately and timely, and from samples collected from appropriate locations.

Inadequate sampling of water (e.g., collecting water from sparse and/or non-representative locations) over a region of interest can reduce the quality of measurements and the accuracy of the simulations. In some cases, frequent human input may be required for a proper sampling process, potentially making the process inefficient and time-consuming. Even drone-based water sampling systems that are operated by a drone pilot may be unsuitable for large-scale water simulation systems. The technology described herein can potentially alleviate the above issues by providing a fully automated drone-based water sampling system that automatically aggregates water sampling requests from a water simulation system, and dispatches and controls one or more drones to obtain the samples and/or corresponding measurements.

Figure 1:
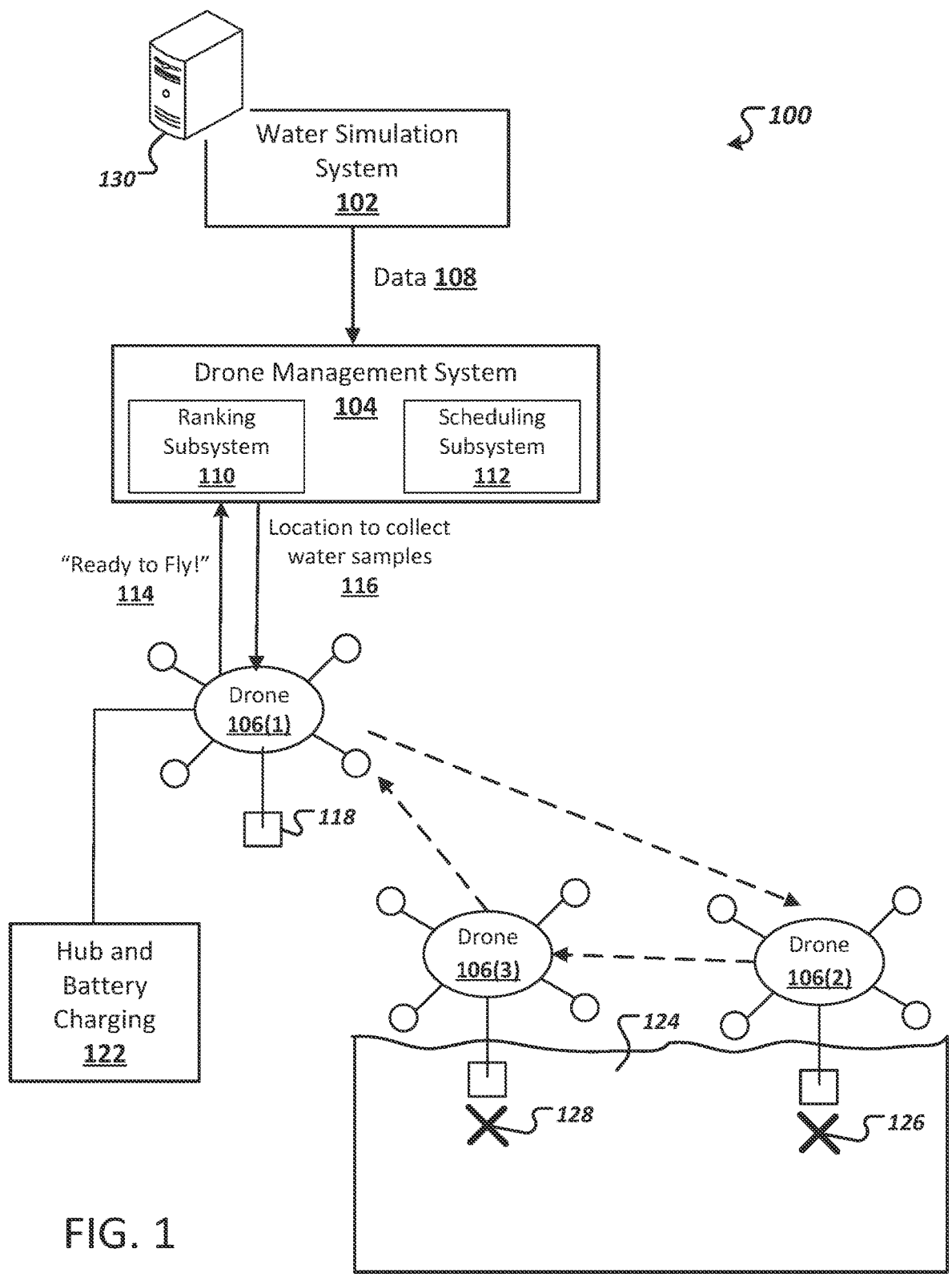
FIG. 1 is a diagram illustrating an example environment for managing drones to take water samples.

FIG. 1 is a diagram illustrating an example environment 100 for managing drones to take water samples. The environment 100 includes a water simulation system 102, a drone management system 104, and one or more drones that are configured to collect water samples.

The water simulation system 102, e.g., a simulator, can generate simulation data associated with a body of water, e.g., the water 124. The data associated with the body of water can include physical states and dynamic properties of the water, such as physical properties, biochemical properties, or other properties of the water. The water can be any body of water in any appropriate geographical region of the world, such as ocean, river, lake, etc.

The water simulation system 102 includes a simulation model that models the properties of the water. For example, the simulation model can include one or more partial differential equations and simulating a property of the water can refer to solving the one or more partial differential equations using a numerical solver in iterations. An example water simulation system 102 is described with reference to the Coastal and Regional Ocean Community model (CROCO) (https://www.croco-ocean.org.)

The water simulation system 102 can take water measurements as inputs in order to perform predictions in the simulations. In some implements, the water simulation system 102 can use the water measurements as initial and boundary conditions of simulation models used in the water simulation system 102. Incomplete input or inaccurate input to the water simulation system, e.g., an error in the initial and boundary conditions, can be propagated and potentially amplified within the simulation model, which can ultimately lead to large uncertainties in the predictions. Therefore, it is important to obtain water measurement data accurately and timely.

The water simulation system 102 can run on one or more computers, e.g., a supercomputer 130 that can be configured to perform many iterations of a numerical solver. The water simulation system 102 can output data 108 associated with one or more desired water measurements. The water simulation system 102 can send the data 108 to the drone management system 104.

The environment can include one or more drones, e.g., drones 106(1), 106(2), and 106(3). In some descriptions below, the drones 106(1), 106(2), and 106(3) can refer to different drones, or can refer to a single drone at different locations. Throughout this specification, a "drone" can generally refer to any type of unmanned aerial vehicle (UAV), which is an aircraft without any human pilot, crew, or passengers on board. The one or more drones are configured to collect water samples.

The one or more drones are configured to collect water samples. For example, a drone 106(1) can be configured to navigate to a first location 126 to collect a first water sample. In some implementations, one or more drones can be configured to collect water samples at several locations associated with a body of water. For example, a first drone can be configured to collect a first water sample at the first location 126, while a second drone can be configured to simultaneously collect a second water sample at a second location 128. As another example, a drone 106(1) can be configured to navigate to a first location 126 to collect a first water sample, and to navigate to the second location 128 to collect a second water sample.

The drone, e.g., the drone 106(1), can include a sample collector 118 that includes a cartage system that can obtain and contain a small amount of water sample. For example, the drone 106(1) can be configured to hover above the water 124 while the sample collector 118 immerses into the water at a desired depth to collect a water sample. In some implementations, the sample collector 118 can include multiple containers that can be configured to contain multiple water samples.

Each water sample can be a small amount of the body of water 124, and can be used to generate water measurements. The available water measurements can depend on the settings and types of the drones and a processing facility that processes the water samples. The water measurements can include salinity, oxygen content, general water quality, turbidity, DNA sequencing, electron microscopy, oil related features, other chemical analyses, etc.

In some implementations, the environment 100 can include a hub 122. The hub 122 can charge one or more batteries for the one or more drones in the environment 100. The hub 122 can provide storage for the one or more drones when they are not in use. The hub 122 can obtain the status of the drone 106(1), e.g., whether maintenance is needed, battery status, etc. The hub 122 can determine whether a drone is ready to fly.

In some implementations, the hub 122 can be a processing facility. The processing facility can include a system that processes a water sample collected by a drone, generates water measurements from the water samples, and sends the water measurements to the water simulation system 102. In some implementations, the drone 106(1) or another system in the environment can process a water sample to generate a water measurement.

The environment 100 can include a drone management system 104. The drone management system 104 controls a drone 106(1) that is configured to collect water samples. In some implementations, the drone management system 104 can configure two or more drones to collect water samples. The drone management system 104 can receive an indication that the drone 106(1) is available to collect one or more water samples from the body of water 124.

For example, the drone management system 104 can receive a notification "Ready to Fly!" 114 from the drone 106(1). In some cases, the drone management system 104 can receive an indication from a hub 122 of the drone. The hub 122 can determine that one or more drones are ready to fly, and can send a notification to the drone management system 104, indicating that the one or more drones are available to collect one or more water samples.

In some implementations, the drone management system 104 itself can determine that a drone is available to collect one or more water samples. In some implementations, the drone management system 104 can receive the indication that the drone is available to collect one or more water samples from another system or device in the environment 100.

The drone management system 104 can determine, based on the received data 108 from the simulation system 102, one or more locations 116 associated with the body of water at which the drone 106(1) is to collect one or more respective water samples. The data 108 from the simulation system 102 can include requests for water samples, the priority and time-sensitiveness of the requests, and so on. In some implementations, the drone management system 104 can include a scheduling subsystem 112. The scheduling subsystem 112 can automatically aggregate requests for water samples received from the water simulation system. The scheduling subsystem 112 can plan out a series of drone flights for one or more drones. The scheduling subsystem 112 can plan and optimize for a minimum number of trips to obtain all or some of the requested samples.

In some implementations, the drone management system 104 can include a ranking subsystem 110. The ranking subsystem 110 can automatically rank the requests for water samples using one or more factors. The one or more factors can include, for example, an amount of needs for the water samples, confidence level or confidence score, time left before the next iteration of the simulation, proximity to the location, priority score, time-sensitiveness, safety, regulations, or a combination of these. For example, the ranking subsystem 110 can ensure that time-critical requests are processed before lower-priority or less time-sensitive requests.

In some implementations, the environment 100 can include multiple water simulation systems with multiple requests. The ranking subsystem can determine the locations to collect water samples based on the requests from the multiple water simulation systems.

For example, the drone management system 104 can receive a request to collect water samples from a "harmful algae bloom" simulation system, a request to collect water samples from a "dissolved oxygen content" simulation system, and a request to collect water samples from an "oil-spill" simulation system. The drone management system 104 can decide to send one or more drones to collect water samples for these requests on the same trip. In some implementations, these simulation systems may desire different sampling locations based on the current conditions of each of these simulations, and the ranking subsystem 110 can determine the locations to collect water samples for these simulation systems.

In some implementations, the drone management system 104 can include a safety subsystem. The safety subsystem can make sure the flights of the one or more drones are safe. The safety subsystem can check for flight hazards, such as storms, and can send out a notice with an aviation authority to alert aircraft pilots of potential hazards along a flight route or at a location that could affect the flight.

In some implementations, the drone management system 104 can include a real-time piloting subsystem. The real-time piloting subsystem can automatically direct and monitor drone flights, can coordinate with ground-based air traffic controllers, e.g., air traffic control (ATC), and resolve conflicts related to airspace incursions.

In some implementations, the drone management system 104 can deploy a drone to collect the water samples after determining that enough samples have been scheduled. In order to reduce the cost and save the time spent on the way to the target locations, the drone management system 104 can accumulate multiple requests for multiple water samples. Once enough samples have been scheduled, the system can determine multiple locations 116 associated with the multiple requests and can deploy a drone to collect the water samples for the multiple requests in one trip.

The drone management system 104 can transmit the one or more locations 116 associated with the body of water to the drone 106(1). After receiving the one or more locations 116, the drone 106(1) can collect one or more respective water samples at the one or more locations 116. The drone 106(1) can reach the desired latitude and longitude included in the location 116, and can obtain the one or more water samples using the sample collector 118.

For example, the one or more locations 116 can include a first location 126 and a second location 128. The drone 106(1) can fly to the first location 126, (e.g., the drone 106(2) is the same drone 106(1) at the location 126), and can collect a first sample at the first location 126. After that, the drone 106(2) can fly to the second location 128, (e.g., the drone 106(3) is the drone 106(1) at the location 128), and can collect a second sample at the second location 128.

In some implementations, the drone management system 104 can maintain contact with the drone 106(2) and can dynamically re-task a drone if a new request comes in during the flight. For example, the drone 106(2) can be tasked to collect a sample at the location 126. The drone management system 104 can receive a new request from the water simulation system 102 to collect a water sample at the location 128, and the new request can be time sensitive. The drone management system 104 can send the location 128 to the drone 106(2). The drone management system 104 can send a signal to the drone 106(2), the signal can include instructions to ask the drone to stop collecting the water sample at location 126 and to navigate to the location 128 to collect the water sample.

In some implementations, after the drone reaches the desired latitude and longitude, the drone, or another system, can determine whether the sample location 116 is viable. The drone can include one or more sensors that can collect sensor data. The drone can process the sensor data to determine whether the sample location 116 is viable. For example, the drone can use a computer vision and/or machine learning algorithm such as an object detection algorithm to process an image obtained by a camera.

If the drone determines that the sample location 116 is suitable, the drone can collect a water sample at the location 116. If the drone determines that the sample location 116 is not suitable, the drone can fly a search pattern until a suitable location is found. For example, the search pattern can cover an area of a radius of one mile or a few miles centered near the sample location 116. Then, the drone can collect a water sample at the suitable location.

For example, the drone 106(1), 106(2), and 106(3) can be the same drone in a flight. After the drone 106(1) reaches the desired location 128, the drone 106(2) can determine whether the sample location 128 is suitable to collect a water sample for a desired water measurement. The drone can use a computer vision algorithm to process an image obtained by a camera. If the drone determines that the sample location 126 is not suitable to collect a water sample for a desired water measurement, the drone 106(2) can fly a small search pattern in order to find a suitable location, e.g., the location 128. The drone 106(2) can fly to the latitude and longitude associated with the location 128. The drone 106(3) can take a water sample at the location 128. More details of searching for a suitable location is described below in connection with FIG. 2.

After sample collection, the drone can fly back to the hub 122. The water sample can be processed by a processing facility, e.g., the hub, to obtain one or more water measurements and analysis using the water sample. The results of the water measurements and analysis can be sent back to the water simulation system 102. The water simulation system 102 can use the results in the water simulation.

Unlike some water measurement techniques that require a pilot to manually operate a drone, the drone management system 104 can automatically control and coordinate the one or more drones to collect water samples at one or more locations 116 provided by the drone management system 104. The drones can obtain water samples over a very large area, and thus the water measurements from the water samples can help improve the accuracy and confidence of the predictions from the water simulation system 102. In some implementations, the drone management system 104 can prioritize time-critical water samples, which is important for some water environments that change very rapidly.

Figure 2:
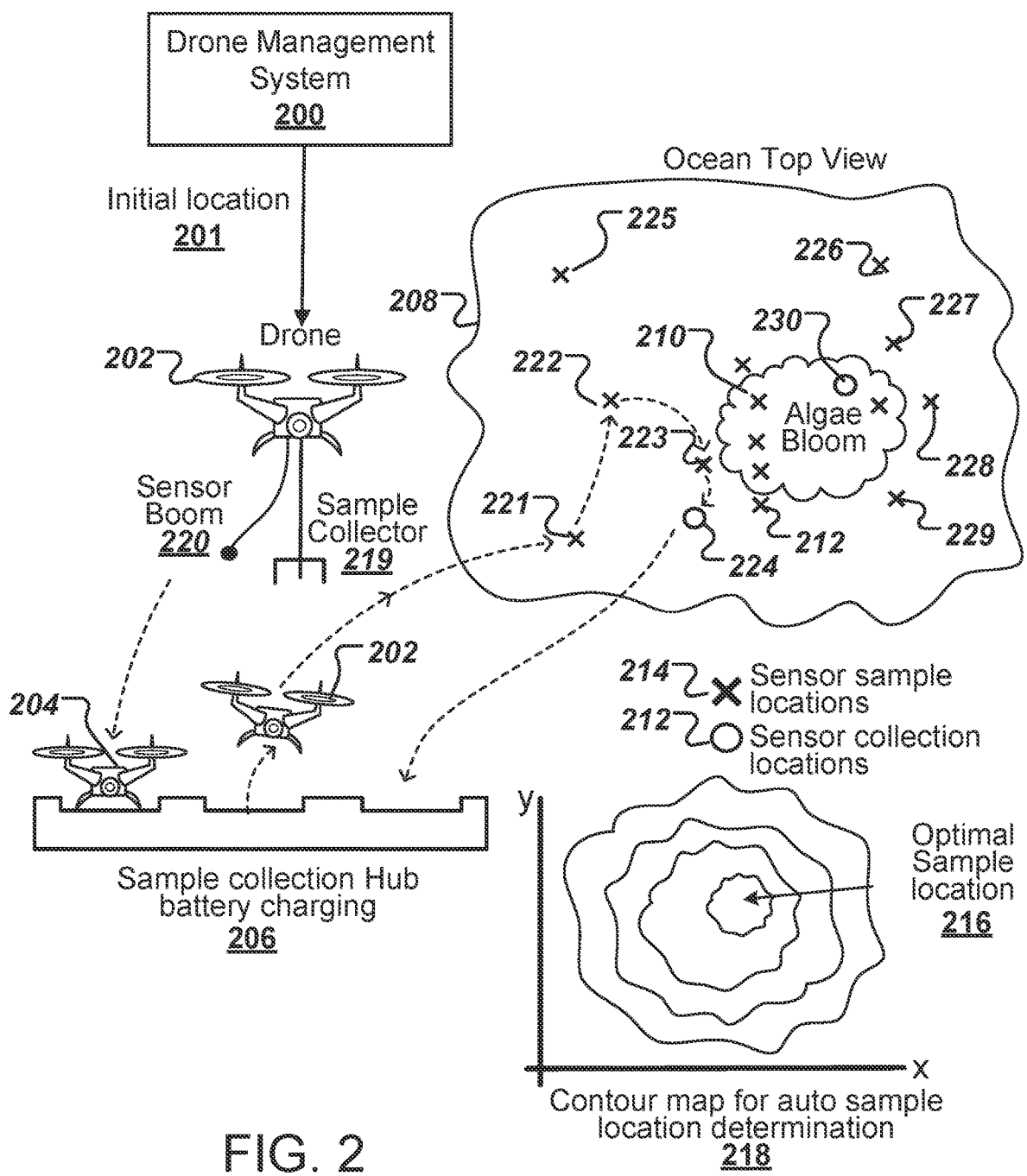
FIG. 2 is a diagram illustrating an example system for dynamically selecting sampling locations.

FIG. 2 is a diagram illustrating an example system 200 for dynamically selecting sampling locations. The example system is a drone management system 200 that controls a drone 202 that is configured to collect water samples. The drone management system 200 can determine an initial location associated with the body of water 208 at which the drone 202 is to collect one or more respective water samples. FIG. 2 shows a top view of the water 208. The drone management system 200 can transmit the initial location 201 to the drone 202.

The drone 202 can include a sample collector 219 that collects and stores water samples. In some implementations, the drone 202 can include a sensor boom 220. The sensor boom 220 is a structure supported by the drone 202, the structure housing one or more sensors. For example, a sensor boom can be a structure that is attached to or extends from a drone 202 and supports one or more sensors on or within the structure. The sensor boom 220 can include one or more sensors, e.g., cameras, lidar sensors, etc., that can be configured to collect sensor data of the water. In some implementations, the sensor boom 220 can include a variety of water sensors, e.g., dissolved-oxygen sensor, turbidity sensor, salinity sensor, UV light emitter/sensor (e.g., for detecting oil), and temperature sensor. The drone 202 can obtain sensor data at one or more sensor sample locations associated with the water 208. The drone 202 can use the sensor data obtained at the one or more sensor sample locations to determine a sample collection location 214.

The drone 202 can stay at a sample collection hub 206 when not flying. The drone 202 can charge its battery at the sample collection hub 206. For example, after the drone 204 flies back to the hub, the drone 204 can charge its battery and can send a signal to the drone management system 200, indicating that it is not ready to fly at the moment. The drone 202 can send a signal to the drone management system 200, indicating that it is ready to fly. After receiving the initial location 201 from the drone management system 200, the drone 202 can fly from the hub 206 towards the water 208.

For example, the drone can receive an initial location 201 from the drone management system 200, and the initial location can be the sample collection location 224. After receiving the initial location 201, the drone 202 can fly from the hub 206 towards the water 208. Instead of directly flying to the sample collection location 224, the drone 202 can fly to a few sensor sample locations 221, 222, and 223, in order to predict whether the sample collection location 224 is suitable to collect the desired water sample. If drone 202 determines that the sample collection location 224 is suitable, the drone 202 can fly to the sample collection location 224 and collect a water sample at the sample collection location 224.

In some implementations, the drone management system 200, e.g., the scheduling subsystem 112, can dynamically re-task drones if new requests come in during the flight. The drone management system 200 can maintain contact with the drone 202, e.g., through one or more wireless communication techniques, such as Wi-Fi, 3G, 4G, or 5G networks, satellite, radio frequency (RF) communication, etc.

For example, the drone management system 200 can transmit an initial location 201 to the drone 202 such that the drone 202 is tasked to take a water sample at the sample collection location 224. After the drone 202 leaves the hub 206, the drone management system 200 can receive a new request to take an additional water sample at an algae bloom area 210. The drone management system 200 can send a second initial location associated with the algae bloom area 210 to the drone 202. After taking the first water sample at the sample collection location 214, the drone 202 can take the second water sample at the algae bloom area 210.

In some implementations, after the drone 202 left the hub 206, the drone management system 200 can receive a request indicating that there is no longer a need to obtain a water sample at the initial location 201. The drone management system 200 can send a notification to the drone 202, indicating that there is no need to obtain the water sample at the initial location 201. After receiving the notification, the drone 202 can fly back to the hub 206, or can fly to the next sample collection location to take the next water sample.

In some implementations, the drone management system 200, the drone 202, or a combination of both, can use sensor data to determine if an initial location 201 is suitable for taking water samples. If the location is not suitable, the drone 202 can fly a search pattern to find a suitable sample collection location.

For example, the drone management system 200 can transmit an initial location 201 to the drone 202 in order to take a water sample at a predicted algae bloom area. The initial location 201 can be at the sample collection location 224, which may or may not have algae bloom. The drone 202 can obtain sensor data, e.g., images or videos using a camera, at one or more sensor sample locations 221, 222, 223. The drone 202 can process the images or videos using a computer vision or machine learning algorithm. For example, the drone 202 can use an object detection algorithm to detect algae bloom in the images or videos. Based on the object detection result, the drone 202 can determine whether the sample collection location 224 is suitable for a water sample for algae bloom. In some implementations, the drone 202 can send the sensor data to the drone management system 200. The drone management system 200 can analyze the sensor data, e.g., using computer vision or machine learning algorithms, and can determine whether an initial location 201 is suitable for sample collection.

If the location is suitable for sample collection, the drone 202 can collect a water sample at the sample collection location 224.

If the location is not suitable for sample collection, the drone 202 can fly a small search pattern until a suitable location is found. For example, the drone 202 can fly to a few sensor sample locations 225, 226, 227, 228, 229, etc. Based on analyzing the sensor data obtained from the sensor locations, the drone 202 can determine an area 210 that has algae bloom. The drone 202 can fly a few more sensor sample locations and can determine a sample collection location 230, e.g., an optimal sample collection location. The drone 202 can take a water sample at the sample collection location 230 which is in the algae bloom area 210.

In some implementations, the drone 202 or the drone management system 200 can automatically determine the sample collection location 214 using a contour map 218. For example, the drone 202 can analyze sensor data obtained at a plurality of sensor sample locations 212. The drone 202 can generate a contour map 218 using the result of analyzing the sensor data obtained at the plurality of sensor sample locations 212. Using the contour map 218, the drone 202 can determine a sample collection location, e.g., an optimal sample collection location 216.

For example, if a water simulation system 102 requests a sample from a location that corresponds to a local maximum or local minimum of a target parameter (e.g., turbidity, salinity, or oxygen density) in a given region, the drone management system 200 can use a contour map 218 to determine the corresponding location. The drone 202 can be flown out and its sensor boom 220 can be used to take measurements at a few locations in the given region. The drone 202 can analyze a contour map 218 associated with the target parameter (e.g., by performing a gradient ascent algorithm or a gradient descent algorithm on sample measurements) to find the local maximum or local minimum of the target parameter. In some implementations, the drone 202 can transfer the measurements at the few locations to one or more remote computing devices, which in turn perform the gradient ascent algorithm or the gradient descent algorithm (or another analogous process) and then transmit identification of the location(s) corresponding to the local maximum or the local minimum to the drone 202. In some implementations, the drone management system 200 can adjust the search radius of the search area in the given region. For example, the maximum search radius can be a 200 yard radius.

Figure 3:
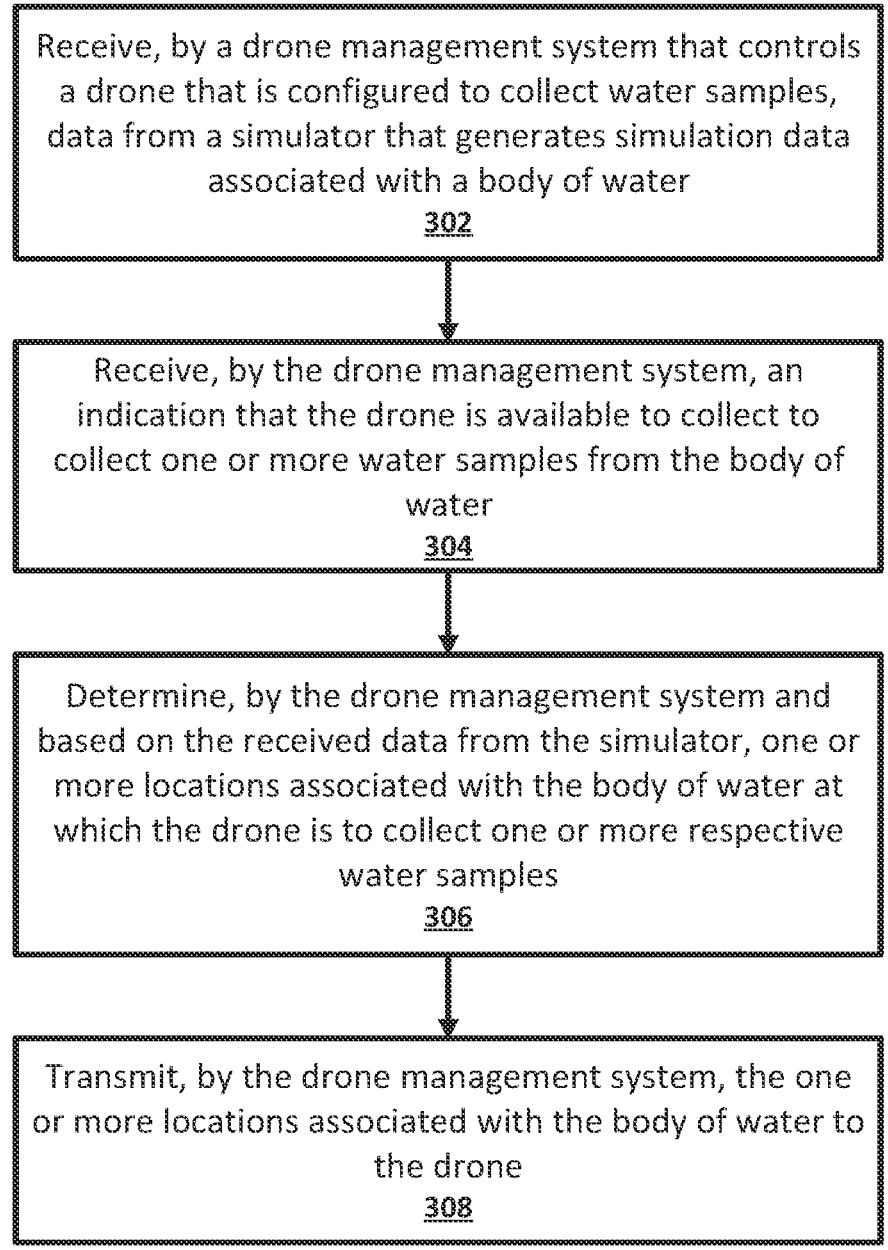
FIG. 3 is a flow chart illustrating an example of a process for drone-based water measurement.

FIG. 3 is a flow chart illustrating an example of a process 300 for drone-based water measurement. The process 300 can be performed by one or more computer systems, for example, the drone management system 104 that controls a drone that is configured to collect water samples, the ranking subsystem 110, the scheduling subsystem 112, or a combination of these. In some implementations, some or all of the process 300 can be performed by the drone management system 104, which can be located near the water 124 or at a remote location.

The system receives data from a simulator that generates simulation data associated with a body of water (302). In some implementations, the data from the simulator can indicate that the simulation is deficient in certain areas of the body of water, e.g., data is missing. The data from the simulator can be related to certain aspects of the water measurements, e.g., water quality. In some implementations, the data from the simulator can include a prediction of the water quality and a confidence score. In some implementations, the data from the simulator can indicate a low confidence score in the prediction.

In some implementations, the data from the simulator can include two or more requests for respective water samples, and the system can rank the two or more requests for the respective water samples based on one or more priority factors.

In some implementations, the data from the simulator can indicate timeliness of the sample collection task, e.g., how far through the simulation the simulator has run. For example, the data can indicate whether the simulator is almost over, in the middle, or at the beginning. If the simulation is almost over, the drone is not going to have enough time to get out and get the water sample in time. If the simulation is at the beginning, the drone is going to have enough time to get the water sample and the corresponding measurements in time. In some implementations, the data can indicate that the simulator is at a certain level of uncertainty in an area of the body of the water and there is one hour left before we can use results from the water sample.

The system receives an indication that the drone is available to collect one or more water samples from the body of water (304). The system can receive the indication from one or more other systems, such as the drone, a hub hosting one or more drones, or another computer. For example, the hub 206 can send a signal to the system indicating that the drone 204 has just landed and recharged, and is ready to go.

The system determines, based on the received data from the simulator, one or more locations associated with the body of water at which the drone is to collect one or more respective water samples (306). In some implementations, a ranking subsystem 110 can determine the one or more locations using one or more factors, including amount of needs, confidence level or score, time left before using the water measurement in the next iteration of the simulation, proximity to the location, priority score, time-sensitiveness, safety, regulations, or a combination of these.

For example, the system can receive requests to take ten water samples, and the system can determine to take five water samples that are ranked highest by the ranking subsystem 110. As another example, the system can determine areas of low confidence in the simulation using the data from the simulator. Based on the areas of low confidence, the system can determine one or more candidate sample collection locations at the areas of low confidence, and can plan a route for the drone to collect water samples at the one or more candidate sample collection locations.

In some implementations, the system can determine the one or more sample collection locations based on a status of the simulation performed by the simulator. For example, the system can determine whether the water samples can be returned and analyzed with sufficient time, such that the system can feed the result of the analysis, e.g., the water measurements, to the subsequent iterations of the simulation. In some implementations, the system, e.g., the scheduling subsystem 112, can plan a route for one or more drones such that the one or more drones can get back in time to effect further iterations of the simulation.

In some implementations, the data from the simulator can include two or more requests for respective water samples. The system can aggregate the two or more requests for the respective water samples to generate an aggregated request, and determine a route to obtain the respective water samples based on the aggregated request.

In some implementations, the system can dynamically select the one or more locations while the drone is deployed to collect water samples. In some implementations, the system can transmit an updated sampling location to the drone. In some implementations, the system can search for the one or more locations associated with the body of the water to take a sample in a given region.

In some implementations, the drone can include a sensor boom that includes one or more sensors configured to collect sensor data. The system can obtain the sensor data at one or more sensor sample locations, and determine, using the sensor data, the one or more locations associated with the body of water at which the drone is to collect the one or more respective water samples.

The system transmits the one or more locations associated with the body of water to the drone (308). The drone can collect one or more water samples at the one or more locations. The system or another computer can perform measurements or analysis of the one or more water samples. The system can provide the result of the measurements or analysis to the simulator.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method, comprising:
   receiving, by a drone management system that controls a drone that is configured to collect water samples, data from a simulator that generates simulation data associated with a body of water;
   receiving, by the drone management system, an indication that the drone is available to collect one or more water samples from the body of water;
   determining, by the drone management system and based on the data from the simulator, one or more locations associated with the body of water at which the drone is to collect one or more respective water samples; and
   transmitting, by the drone management system, the one or more locations associated with the body of water to the drone.

2. The method of claim 1, wherein the data from the simulator comprises two or more requests for respective water samples, and the method further comprises:
   ranking the two or more requests for the respective water samples based on one or more priority factors.

3. The method of claim 1, wherein the data from the simulator comprises two or more requests for respective water samples, and the method further comprises:
   aggregating the two or more requests for the respective water samples to generate an aggregated request; and
   determining a route to obtain the respective water samples based on the aggregated request.

4. The method of claim 1, comprising dynamically selecting, by the drone management system, the one or more locations while the drone is deployed to collect water samples.

5. The method of claim 4, wherein dynamically selecting the one or more locations comprises:
   transmitting, by the drone management system, an updated sampling location to the drone.

6. The method of claim 4, wherein dynamically selecting the one or more locations comprises:
   searching, by the drone management system, for the one or more locations associated with the body of the water to take a sample in a given region.

7. The method of claim 4, wherein the drone comprises a sensor boom that includes one or more sensors configured to collect sensor data, wherein dynamically selecting the one or more locations comprises:
- obtaining, by the drone management system, the sensor data at one or more sensor sample locations; and
- determining, by the drone management system and using the sensor data, the one or more locations associated with the body of water at which the drone is to collect the one or more respective water samples.

8. A drone management system comprising:
- one or more computers and one or more storage devices storing instructions that are operable, when executed by the one or more computers, to cause the one or more computers to perform operations comprising:
  - receiving, by the drone management system that controls a drone that is configured to collect water samples, data from a simulator that generates simulation data associated with a body of water;
  - receiving, by the drone management system, an indication that the drone is available to collect one or more water samples from the body of water;
  - determining, by the drone management system and based on the data from the simulator, one or more locations associated with the body of water at which the drone is to collect one or more respective water samples; and
  - transmitting, by the drone management system, the one or more locations associated with the body of water to the drone.

9. The system of claim 8, wherein the data from the simulator comprises two or more requests for respective water samples, and the operations further comprise:
- ranking the two or more requests for the respective water samples based on one or more priority factors.

10. The system of claim 8, wherein the data from the simulator comprises two or more requests for respective water samples, and the operations further comprise:
- aggregating the two or more requests for the respective water samples to generate an aggregated request; and
- determining a route to obtain the respective water samples based on the aggregated request.

11. The system of claim 8, comprising dynamically selecting, by the drone management system, the one or more locations while the drone is deployed to collect water samples.

12. The system of claim 11, wherein dynamically selecting the one or more locations comprises:
- transmitting, by the drone management system, an updated sampling location to the drone.

13. The system of claim 11, wherein dynamically selecting the one or more locations comprises:
- searching, by the drone management system, for the one or more locations associated with the body of the water to take a sample in a given region.

14. The system of claim 11, wherein the drone comprises a sensor boom that includes one or more sensors configured to collect sensor data, wherein dynamically selecting the one or more locations comprises:
- obtaining, by the drone management system, the sensor data at one or more sensor sample locations; and
- determining, by the drone management system and using the sensor data, the one or more locations associated with the body of water at which the drone is to collect the one or more respective water samples.

15. A non-transitory computer-readable medium storing software comprising instructions executable by one or more computers which, upon such execution, cause the one or more computers to perform operations comprising:
- receiving, by a drone management system that controls a drone that is configured to collect water samples, data from a simulator that generates simulation data associated with a body of water;
- receiving, by the drone management system, an indication that the drone is available to collect one or more water samples from the body of water;
- determining, by the drone management system and based on the data from the simulator, one or more locations associated with the body of water at which the drone is to collect one or more respective water samples; and
- transmitting, by the drone management system, the one or more locations associated with the body of water to the drone.

16. The non-transitory computer-readable medium of claim 15, wherein the data from the simulator comprises two or more requests for respective water samples, and the operations further comprise:
- ranking the two or more requests for the respective water samples based on one or more priority factors.

17. The non-transitory computer-readable medium of claim 15, wherein the data from the simulator comprises two or more requests for respective water samples, and the operations further comprise:
- aggregating the two or more requests for the respective water samples to generate an aggregated request; and
- determining a route to obtain the respective water samples based on the aggregated request.

18. The non-transitory computer-readable medium of claim 15, comprising dynamically selecting, by the drone management system, the one or more locations while the drone is deployed to collect water samples.

19. The non-transitory computer-readable medium of claim 18, wherein dynamically selecting the one or more locations comprises:
- transmitting, by the drone management system, an updated sampling location to the drone.

20. The non-transitory computer-readable medium of claim 18, wherein dynamically selecting the one or more locations comprises:
- searching, by the drone management system, for the one or more locations associated with the body of the water to take a sample in a given region.

* * * * *